United States Patent
Krenzer et al.

(10) Patent No.: US 6,657,122 B1
(45) Date of Patent: Dec. 2, 2003

(54) MULTIPLE PARALLEL CONDUCTOR FOR WINDINGS OF ELECTRICAL DEVICES AND MACHINES

(75) Inventors: Hans-Joachim Krenzer, Arolsen (DE); Joachim Runge, Arolsen (DE)

(73) Assignee: Nexans, Paris (FR)

( * ) Notice: Subject to any disclaimer, the term of this patent is extended or adjusted under 35 U.S.C. 154(b) by 64 days.

(21) Appl. No.: 09/640,649

(22) Filed: Aug. 18, 2000

(30) Foreign Application Priority Data

Aug. 20, 1999 (DE) ................................. 299 14 596 U

(51) Int. Cl.[7] ............................................... H01B 17/00
(52) U.S. Cl. ................. 174/49 B; 174/72 B; 174/88 B; 174/149 R
(58) Field of Search ............... 174/149 B, 27, 174/26 R, 72 R, 72 B, 88 R, 113 R, 149 R; 310/208

(56) References Cited

U.S. PATENT DOCUMENTS 3,312,773 A  4/1967  Lit et al. .................. 174/119
4,704,170 A * 11/1987  Priaroggia .................. 156/53
6,051,793 A * 4/2000  Byrne et al. ............. 174/120 R

FOREIGN PATENT DOCUMENTS

| DE | 1 287 684    | 1/1969  |
|----|--------------|---------|
| DE | 38 23 938 A1 | 2/1990  |
| DE | 39 23 448 C2 | 1/1991  |
| JP | 6-70499      | 3/1994  |
| WO | WO 95/30991  | 11/1995 |

\* cited by examiner

Primary Examiner—Anthony Dinkins
Assistant Examiner—W. David Walkenhorst
(74) Attorney, Agent, or Firm—Sughrue Mion, PLLC

(57) ABSTRACT

A multiple parallel conductor (1), particularly a transposed conductor, for windings of electrical devices and machines is described, which has a plurality of individually electrically insulated partial conductors (3) that together are provided with a common wrapping which comprises a perforated tape (8).

22 Claims, 1 Drawing Sheet

MULTIPLE PARALLEL CONDUCTOR FOR WINDINGS OF ELECTRICAL DEVICES AND MACHINES

This application is based on and claims the benefit of German Patent Application No. 299 14 596.4 filed Aug. 20, 1999, which is incorporated by reference herein.

BACKGROUND OF THE INVENTION

The invention relates to a multiple parallel conductor, particularly a transposed conductor, for windings of electrical devices and machines with a plurality of individually electrically insulated partial conductors which are jointly provided with a wrapping.

Electrical conductors of large cross section for windings of electrical devices and machines, such as transformers, are divided into a number of partial conductors that are insulated from each other and are connected in parallel at their ends. In so-called transposed conductors, rectangular partial conductors made of copper or aluminum are joined to form an approximately rectangular overall cross section. To minimize the influence of current displacement, a possibly repeated position exchange of the partial conductors within the overall cross section of the transposed conductor is carried out over the length of the transposed conductor. For this purpose, the partial conductors are offset at a predetermined point using a suitable tool, and the position of the partial conductors within the transposed conductor is correspondingly changed.

Such a method is known from DE 3923448 C1.

The transposed conductor is usually provided with a common wrapping of insulating tapes, whose task is to hold the transposed conductor together when it is wound onto a supply reel, during transport, or when it is unwound from a supply reel.

Particularly in transformers, the occurring electrical losses cause significant heating of the transposed conductors used for the windings. In this type of devices it is therefore necessary to remove the dissipated heat. Typically, transformer oil is used for this purpose. The efficiency of the cooling depends decisively on the wrapping.

EP-0746861 B1 discloses a multiple parallel conductor in which the partial conductors are wrapped with a woven tape. The mesh size of this woven tape measures at least 2 mm. The weft and warp threads are made of polyester or a polyester-containing blend yarn. To increase the strength of the woven tape and thus of the multiple parallel conductor, the woven tape is provided with a selvage. The woven tape remains on the multiple parallel conductor and thus forms part of the winding. The advantage of such a winding is that good cooling is achieved.

The disadvantage is that the woven tape is costly to manufacture and is very unstable per se, which makes it difficult to handle during wrapping. Since the woven tape easily shifts, it is difficult to maintain the winding traction required when winding a transformer coil.

SUMMARY OF THE INVENTION

The object of the present invention is to define a multiple parallel conductor that is particularly easy to manufacture and that has particularly good heat removal.

This object is attained by a multiple parallel conductor for windings of electrical devices and machines with a plurality of individually electrically insulated partial conductors which are jointly provided with a wrapping, characterized in that the wrapping comprises a perforated tape.

Additional advantageous embodiments of the invention will be apparent from the description below.

In addition to the advantages resulting from the invention described above, the multiple parallel conductor according to the teaching of the invention has the further advantage that the wrapping of the multiple parallel conductor is introduced into the winding of the transformer and remains there. The material of the wrapping is compatible with transformer oil. The wrapping creates small gaps between the partial conductors through which the transformer oil can pass so that the cooling action is enhanced.

BRIEF DESCRIPTION OF THE DRAWINGS

The invention will now be described in greater detail with reference to accompanying drawings, wherein.

DETAILED DESCRIPTION OF THE INVENTION

Figure 1:
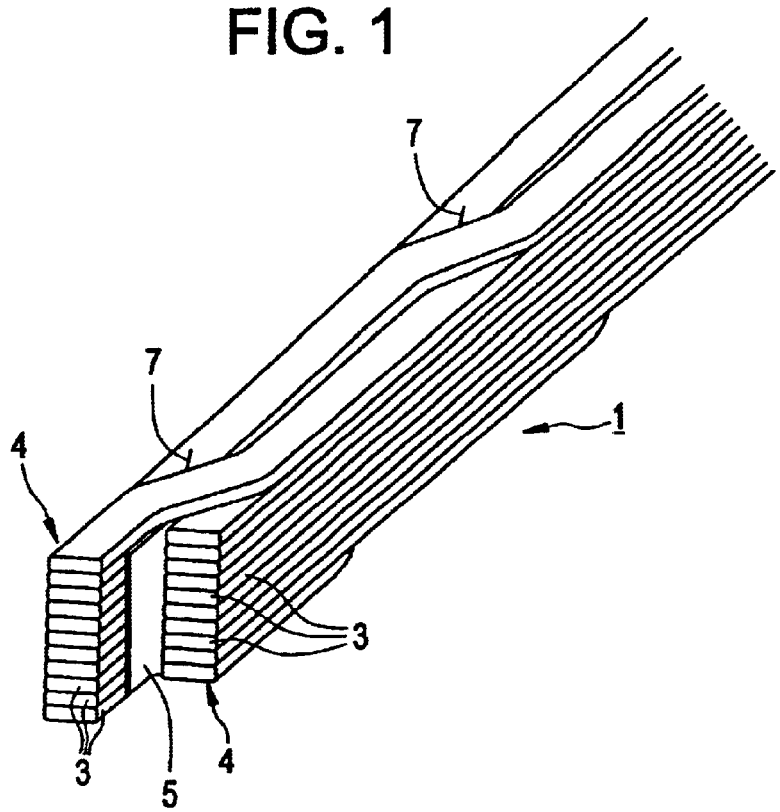
FIG. 1 illustrates a multiple parallel conductor in accordance with the invention.

FIG. 1 shows a multiple parallel conductor 1, as it is used, for example, in the form of a transposed conductor in transformer windings. This multiple parallel conductor is assembled from a plurality of flat, rectangular partial conductors 3 that are arranged in two side-by-side stacks 4. Between the two stacks 4 a paper strip 5 may be provided. Each partial conductor 3 is provided with an insulating enamel coating. The partial conductors 3 are flatly offset by bending at predetermined intervals such that their position within the overall cross section of the multiple parallel conductor 1 regularly changes at comparatively short intervals. The points of offset are identified by the number 7 in FIG. 1.

Figure 2:
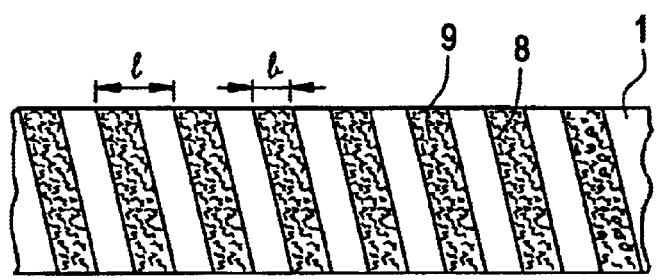
FIG. 2 illustrates a wrapping tape to be used in conjunction with the invention.

To increase the stability of the multiple parallel conductor 1, the conductor is provided with a wrapping of a tape 8 (see FIG. 2), which has a plurality of perforations or holes 9. Tape 8 is applied to multiple parallel conductor 1 at a layer pitch 1 which is greater than width b of tape 8. The perforations or holes 9 preferably have a cross section greater than four mm$^2$. The perforations or holes 9 and the distance between two adjacent turns of tape 8 ensure optimal access of the transformer oil to the partial conductors 3, so that excellent cooling and simultaneous mechanical stability of multiple parallel conductor 1 is achieved.

For many windings it may be advantageous to wrap tape 8 onto the multiple parallel conductor 1 with overlapping tape edges. In this arrangement it is deliberately accepted that the access cross section to the partial conductors 3 is smaller than in the solution shown in FIG. 2. On the other hand the stability of the multiple parallel conductor 1 is greater.

It has been found to be advantageous if the material of tape 8 exhibits high tensile strength on the one hand and good compatibility with the transformer oil on the other. For example, tapes made of cellulose, aramide or mineral or glass fibers, which may be coated with a bakable resin, e.g., epoxy resin, come into consideration.

Any cross-sectional form of perforations or holes 9 is suitable, e.g., round, triangular or polygonal. An optimum between permeability and tensile strength should be achieved.

Figure 3:
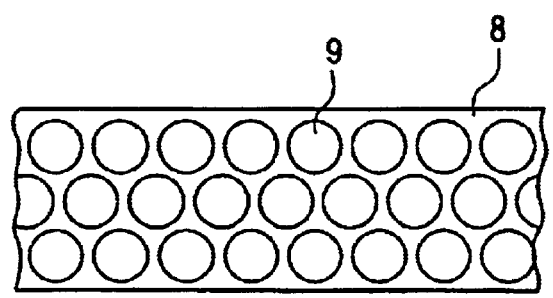
FIG. 3 shows a top view of a tape provided with holes or perforations.

FIG. 3 shows the top view of a tape 8 provided with perforations or holes 9. The holes are round and have a cross section that is greater than four mm². The tape is 29 mm wide. The material selected is polyaramide, which is highly tear-resistant.

What is claimed is:

1. A multiple parallel conductor for winding of electrical devices and machines comprising:

a plurality of individually electrically insulated conductors which are jointly provided with a wrapping, wherein the wrapping includes a perforated tape, said perforated tape having perforations produced by stamping and said perforations having a cross section of at least 4 mm².

2. The multiple parallel conductor of claim 1, wherein the tape is made of a material that is resistant to transformer oil.

3. The multiple parallel conductor of claim 1, wherein the tape is made of a material based on cellulose.

4. The multiple parallel conductor of claim 1, wherein the tape is made of aramide.

5. The multiple parallel conductor of claim 1, wherein the tape is coated with a bakable resin.

6. The multiple parallel conductor of claim 5, wherein the resin is an epoxy resin.

7. The multiple parallel conductor of claim 1, wherein the tape is wrapped around the multiple parallel conductor at a pitch which is equal to or greater than the width of the tape.

8. The multiple parallel conductor of claim 1, wherein the tape is wrapped around the multiple parallel conductor with overlapping tape edges.

9. The multiple parallel conductor of claim 1, wherein the tape covers less than 50% of the outer surface of the multiple parallel conductor.

10. The multiple parallel conductor of claim 1, wherein said conductor is a transposed conductor.

11. A method of creating a multiple parallel conductor for winding of electrical devices and machines, said method comprising:

providing a tape for wrapping a plurality of partial conductors;

stamping said tape to create a perforated tape; said perforations having a cross section of at least 4 mm²; and wrapping a plurality of individually electrically insulated partial conductors with said perforated tape.

12. The method of claim 11, wherein said tape is made of a material that is resistant to transformer oil.

13. The method of claim 11, wherein the tape is made of a material based on cellulose.

14. The method of claim 11, wherein the tape is made of aramide.

15. The method of claim 11, wherein the tape is coated with a bakable resin.

16. The method of claim 15, wherein the resin is an epoxy.

17. The method of claim 11, wherein the tape is wrapped around the multiple parallel conductor at a pitch which is equal to or greater than the width of the tape.

18. The method of claim 11, wherein the tape is wrapped around the multiple parallel conductor with overlapping tape edges.

19. The method of claim 11, wherein the coverage of the multiple parallel conductor is less than 50% of its surface.

20. The method of claim 11, wherein the conductor is a transposed conductor.

21. A multiple parallel conductor for winding of electrical devices and machines comprising:

a plurality of individually electrically insulated conductors which are jointly provided with a wrapping, wherein the wrapping includes a perforated tape, said tape is made of a material based on cellulose and said perforations have a cross section of at least 4 mm².

22. A multiple parallel conductor for winding of electrical devices and machines comprising:

a plurality of individually electrically insulated conductors which are jointly provided with a wrapping, wherein the wrapping includes a perforated tape, said tape is coated with a bakable resin and said perforations have a cross section of at least 4 mm².

* * * * *